form the Naphthol AS compounds which are arylides of 2-hydroxy-3-naphthoic acid and related β-hydroxy carboxylic acid derivatives, acetoacetarylides and related α-oxocarboxylic acid arylides and pyrazolones. However, other compounds may be employed which are capable of coupling to yield a component having the required metallizable group in ortho position to the azo linkage. Thus, in addition to the coupling components specifically set forth in the examples, the following coupling components may be employed: 2-naphthol, 2-hydroxy-3-(N-2',5'-dimethoxy)naphthanilide, 2-hydroxy-3-(N-naphthyl) naphthamide, 2-hydroxy-3-(N-p-chloro) naphthanilide, 2-hydroxy-3-(N-2-methoxy-3-dibenzofuranamino) naphthamide, 2-hydroxyanthraquinone-3-(N-o-tolyl) carboxamide, 2-hydroxy-3-dibenzofuran(N-2,5-dimethoxy)carboxanilide, bis(acetoacet)-benzidide, bis-(acetoacet) tolidide, acetoacet-4-chloro-2,5-dimethoxyanilide, 2-hydroxy-3-carbazole(p-chloro) carboxanilide, diterephthaloyl - α,α' - bis[acet(3 - chloro - 2,4 - dimethoxy)anilide], phenylmethylpyrazolone, 2-hydroxy-5-nitroaniline→resorcinol, 2-hydroxy-4-nitroaniline→2-naphthol. In the case of the couplers in the last two examples listed, wherein the o-hydroxyazo linkage is present in the coupler per se, any ordinary diazo compounds may be employed, such as m-chloroaniline, o-nitroaniline, 1-aminoanthraquinone and 2-amino-4,4'-dichlorodiphenyloxide. Other similar couplers may be employed, such as those listed in German Patent 618,748.

The azoic dye to be aftertreated in accordance with this invention should be devoid of solubilizing groups in order to prevent loss of color, bleeding or the like, by dissolution of the dye in the aftertreating bath. Specifically, water solubilizing groups such as sulfonic acid groups, carboxylic acid groups or the like, should not be present in the dye.

This invention is operative on any of the various types of fibrous materials, such as for example those having a basis of cellulose acetate, silk, nylon, cotton, regenerated cellulose, polymeric material and the like, which can be dyed or printed with the aforementioned types of dyes.

In general, the aftertreatment of the dyed fibers is carried out with the soap and metallizing compound in an aqueous dispersion at an elevated temperature for about 30 seconds to 20 minutes. Boiling temperatures are preferred, although lower temperatures may in some cases be used, as for example from about 70 to 100° C. The aftertreating bath is maintained at an alkaline pH by the addition thereto of a suitable alkalizing agent. While caustic soda is preferred for this purpose, other known agents, such as sodium carbonate and the like, may be employed. The proportions of ingredients in the aftertreating bath, temperature and duration of treatment and other conditions will of course be interrelated and variable, depending on the fibrous material and dye being treated, amount of dye on the fibrous material, etc. In general, a liter of aftertreating bath should contain from about ½ to 5 g. of soap and about 1 g. of metallizing compound. However, these proportions may, obviously, be adjusted as required. At least 0.1 g. of metallizing compound is usually necessary. More than 1 g. of metallizing compound per liter of treating bath is in most cases wasteful, although it may not have any deleterious results. The aftertreating bath is generally employed in a fiber:liquor ratio of about 1:20 although other ratios may be called for in any particular instance.

Metallization is more efficient when carried out in an alkaline bath than when carried out in a neutral or acid medium. Therefore, when carried out in the soaping bath as proposed, the conditions are those of greatest efficiency, in addition to the advantage of eliminating a separate soaping step. However, in alkaline medium,

---

United States Patent Office 2,768,053
Patented Oct. 23, 1956

2,768,053

AFTERTREATMENT OF DYED FIBROUS MATERIAL

Clemens Streck, Loudonville, N. Y., assignor to General Aniline & Film Corporation, New York, N. Y., a corporation of Delaware No Drawing. Application October 22, 1952,
Serial No. 316,305

19 Claims. (Cl. 8—42)

The present invention relates to a process of obtaining dyeings comprising metallized derivatives of azo dyes which do not contain the usual solubilizing groups and to compositions of matter useful in such process.

Azo dyes which do not contain solubilizing groups are usually formed on the fiber according to well-known methods. The fiber may be impregnated with an amine and a coupling component, and treated with sodium nitrite under such conditions that diazotization and coupling occur, thus forming the insoluble dyestuff on the fiber. The fiber may be impregnated with a coupling component and passed into a diazo solution under such conditions that coupling occurs on the fiber. The fiber may be impregnated with a coupling component and then developed by passing through a bath containing a fast color salt under suitable conditions. Fast color salts are diazo compounds which are relatively stable and, except for a few diazos which are sufficiently stable per se, are stabilized by salt formation such as with certain metallic salts, e. g. $MgCl_2$, $ZnCl_2$, $SnCl_2$, etc., arylsulfonic acids such as naphthalene-1,5-disulfonic acid and naphthalene-1,3,6-trisulfonic acid, and also borofluoric acid. The fiber may also be padded with a diazo stabilized as a diazoamino compound together with a coupling component and developed under suitable conditions. Other methods and variations may be used.

This invention is based upon the discovery that fibrous material dyed with an azoic dye devoid of solubilizing groups and capable of conversion into a complex metal compound may be endowed with improved light- and chlorine-fastness properties and improved shades by means of an aftertreatment with a soaping bath in which is present at least one metallizing compound of the group consisting of the salts and hydroxides of copper, cobalt and nickel.

The azoic dyes to which the above described aftertreatment is applicable are in general produced by coupling the proper diazo component and coupling component on the fiber to form thereon or therein an azo dye capable of conversion to a complex metal compound. Such dyes are those capable of forming stable chelation complexes and are characterized by having metallizable groups in ortho and ortho' positions with respect to the azo linkage. The preferred metallizable groups are hydroxy groups but other groups are operative such as —$OCH_3$, —$OCH_2COOH$, a loosely held —$NH_2$ group, and the like. These dyes are well known in the art and no claim is made thereto or to their metallized products since the invention herein resides in the aftertreatment more fully described below.

Thus, in addition to the diazo components specifically set forth in the examples, other suitable aromatic amines may be employed for coupling with a suitable coupling component to produce an azoic dye with the above described characteristics, as for example the diazos of 4-amino-4'-nitro-2,5-dimethoxyazobenzene, 4'-amino-2',5'-diethoxybenzanilide, 4-nitrilo-2,5-diethoxyaniline and the like. Coupling components may, in general, be selected metals have a tendency to precipitate as hydroxides, whereby difficulty is experienced in maintaining the aftertreating bath in the uniform homogeneous condition which is desirable for obtaining the desired results.

It has been found that the addition of an amino or hydroxycarboxylic acid capable of forming a complex with the metallizing agent acts as a coordinating agent to maintain the copper, cobalt or nickel compounds in the aftertreating bath in solution. Examples of such acids which have been found operative are glycine, alanine, aminobutyric acid, leucine, phenylalanine, proline, aspartic acid, glutamic acid, dimethylglycine, glycollic acid, lactic acid, α-hydroxybutyric acid and tartaric acid. Theoretically, these acids should be added to the aftertreating bath in amounts approximately molecularly equivalent to that of the metallizing compound in the bath, but in actual practice these proportions may be departed from without incurring unduly deleterious results.

As stated above, the metallizing compounds operative in the instant invention are the salts and hydroxides of a metal selected from the group consisting of copper (cupric), nickel and cobalt. By way of example, the aforementioned metals may be employed in the form of their chlorides, sulphates, acetates, formates, stearates, phenol sulfonates, and the like. Those compounds are preferred which are relatively water soluble or dispersible.

The soap employed is the salt of a long chain fatty acid. These generally include the alkali metal and amine salts of stearic, palmitic, oleic, and lauric acids and the like. The sodium or potassium salts of palmitic or stearic acids are preferred, however, in view of their ready availability and other desirable properties. As with the metallizing compound, soaps are preferred which are relatively water soluble or dispersible.

It will be understood that various known additives may be included in the aftertreating bath of this invention for their known functions. The following examples are illustrative of the invention and are not to be regarded as limitative. All percentages and proportions given are based on the weight of the fibrous material, unless otherwise indicated.

Example 1

50 g. of a cotton dyeing produced from the stabilized diazo salt of 4-amino-2,5-dimethoxy-4'-nitroazobenzene and 2-hydroxy-3-naphthanilide are aftertreated for 5 minutes at the boil with a solution containing 3 g. soap, 0.5 cc. caustic soda 34° Bé. and 0.5 g. cupric chloride made up to 1 liter with water. The copper chloride is preferably added after heating the bath to 70–100° C.

The shade thus obtained is a darker jet black of improved light- and chlorine-fastness as compared with a similar dyeing aftertreated only with soap.

Example 2

50 g. of a cotton dyeing produced from the stabilized tetrazo of dianisidine and 3-hydroxy-2-naphthanilide are aftertreated at the boil with a solution containing 3 g. soap, 0.75 cc. caustic soda 34° Bé., and 1.5 g. copper phenol sulfonate made up to 1 liter with water. The shade obtained is somewhat redder and much faster to light than a similar dyeing not treated with the copper salt.

Example 3

50 g. of a cotton dyeing produced from the stabilized tetrazo of dianisidine and 3-hydroxy-2-naphthanilide are aftertreated at the boil for 5 min. with a solution containing 3 g. soap, 0.25 cc. caustic soda 34° Bé., and 1.5 g. cupric stearate made up to 1 liter with water. The shade is slightly redder and the light-fastness much better than in the case of a sample not treated with the copper salt.

Example 4

50 g. of a cotton dyeing produced from diazotized and stabilized 3-amino-4-methoxybenzenesulfon-N-butylamide and 3-hydroxy-2-naphthanilide are treated as in Example 1. A similar sample is treated with only 3 g. soap in a liter of water. There is some improvement in shade in the copper-treated sample and considerable improvement in light-fastness over the sample not treated with the copper salt.

Example 5

Example 4 was repeated, using the stabilized diazo from 5-nitro-o-anisidine. The product was deeper in shade and had better light-fastness than the uncoppered sample.

Example 6

50 g. of a cotton dyeing produced from dianisidine, tetrazotized and stabilized as a diazoamino compound, and 3-hydroxy-2-naphthanilide are aftertreated by boiling for 5 minutes with a solution containing 3 g. soap, 0.25 cc. caustic soda 34° Bé., and 0.5 g. cupric chloride made up to 1 liter with water. A similar sample was soaped without the copper chloride addition. The copper-treated dyeing was bluer in shade and had better light-fastness.

Example 7

50 g. of a cotton dyeing produced from cresidine, diazotized and stabilized as a diazoamino compound, and 3-hydroxy-2-(m-nitronaphthanilide) are aftertreated for 5 min. at the boil as in Example 6. The copper-treated sample has a somewhat yellower shade and improved light-fastness in contrast to the sample soaped but not containing a copper salt.

Example 8

45 parts cupric hydroxide and 55 parts Maratan A (commercial magnesium lignin sulfonate dispersing agent) are mixed together, pasted with a small amount of water and dried.

50 g. of a cotton dyeing produced from the stabilized tetrazo of dianisidine and 3-hydroxy-2-naphthanilide are aftertreated at the boil for 5 minutes with a solution containing 3 g. soap and 1.5 g. of the above-described dispersed cupric hydroxide preparation made up to 1 liter with water. The shade is slightly redder and the light-fastness better than in an untreated dyeing.

Example 9

50 g. cotton material are impregnated in usual manner with 4-benzamido-2,5-diethoxybenzene diazonium chloride zinc chloride double salt and 2-hydroxy-3-naphthoic acid anilide, developed and rinsed.

The material is treated at the boil for about 5 minutes in a solution containing 3 g. soap, 1 g. sodium carbonate, 0.5 g. glycine and 0.5 g. cupric chloride per liter of water, rinsed and dried.

In contrast to a similar dyeing, soaped in a bath not containing the glycine and copper salt, the shade is a redder blue, has much better light fastness and an improved chlorine fastness.

Example 10

50 g. cotton are treated as in Example 9, except that as diazo is used 2,5-dimethoxy-4-(p-nitrophenylazo)-benzene diazonium chloride zinc chloride double salt.

The shade of the copper chloride-glycine treated material is a much jetter, bloomier black, of better light and chlorine fastness.

Example 11

50 g. cotton are treated as in Example 9, except that as diazo is used 5-chloro-o-methoxybenzene diazonium chloride zinc chloride double salt.

The shade of the copper chloride-glycine treated material is a bluer red shade of much better light fastness and an improved chlorine fastness.

Example 12

50 g. cotton material are impregnated in usual manner with the 2-methoxy-4-nitrobenzene diazonium salt of naphthalene-1,5 - disulfonic acid and 2-hydroxy-3-naphthoic acid 2-naphthalide, developed and rinsed.

The material is aftertreated at the boil for about 5 minutes with a solution containing 3 g. soap, 1 g. sodium carbonate, 0.5 g. tartaric acid and 0.5 g. cupric chloride per liter of water.

A dyeing soaped in the presence of the copper chloride-tartaric acid is a maroon shade in contrast to a red shade if those components are not present. It also has much better light-fastness.

*Example 13*

50 g. cotton are treated as in Example 12, employing as diazo 5-chloro-2-methoxybenzene diazonium chloride zinc chloride double salt and as coupling component bisacetoacet-o-tolidide. The soaping, employing the same bath as in Example 12, is continued for 20 minutes. A greener shade is obtained which has better light-fastness than a similar dyeing which did not have the metallizing treatment.

*Example 14*

50 g. cotton are padded with phenyl methyl pyrazolone and coupled with dianisidine tetrazo zinc chloride double salt. The dyeing is rinsed and soaped for 5 minutes at the boil with 3 g. soap, 1 g. sodium carbonate, 0.5 g. glycollic acid and 0.5 cupric chloride per liter of water.

The shade is a yellowish brown in contrast to a dyeing which is not treated with the copper-glycollic acid combination, and has better light-fastness.

*Example 15*

50 g. cotton material are padded with an alkaline solution of dianisidine, tetrazotized and stabilized as a diazoamino compound, and 3-hydroxy-2-naphthoic acid anilide. The material is dried and developed in acid fumes in conventional manner. It is rinsed and treated for 5 minutes at the boil in a solution containing 3 g. soap, 0.5 g. cupric acetate, 0.5 g. tartaric acid and 1 g. sodium carbonate per liter of water.

The shade is a slightly redder shade of blue and has much better light and chlorine fastness than a dyeing treated in similar manner but without the copper salt.

*Example 16*

50 g. nylon are impregnated with 1% on the weight of fiber of:

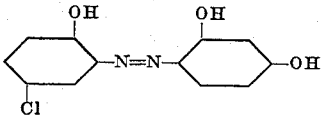

which has previously been dissolved with a small amount of Cellosolve and 0.2 cc. caustic 34° Bé., and 0.65% 4-nitro-o-anisidine made up to a volume of 1:20 (fiber:liquor). The impregnation treatment takes about 15 minutes at 65° C., after which 5% acetic acid (28% strength) is added and the bath maintained for 30 minutes. The material is rinsed and developed in a bath with 3% sodium nitrite and 3% sulfuric acid for 30 min. at 30° C. 10% sodium acetate is added and after about 10 minutes the bath is heated to about 70° C. for 15 minutes. The material is rinsed and aftertreated for 20 minutes at 80° C. in a solution containing 3 g. soap, 0.5 g. $CuCl_2$, 0.5 g. tartaric acid and 1 g. sodium carbonate per liter of water.

The dyeing is a deep brown having a good fastness to light.

*Example 17*

50 g. acetate silk are dyed as in Example 16 and aftertreated in an identical copper-containing bath for 30 min. at 85° C.

A fast to light brown is obtained. A similar dyeing without the copper treatment is very much yellower in shade and does not have the same degree of light fastness.

Various modifications and variations of this invention will be obvious to a worker skilled in the art and it is understood that such modifications and variations are to be included within the purview of this application and the spirit and scope of the appended claims.

I claim:

1. A process comprising aftertreating fibrous material dyed with an azoic dye devoid of solubilizing groups and containing in o,o'-positions relative to an azo linkage groups capable of conversion to a complex metal compound with an alkaline composition comprising a soap and at least one metallizing compound of the group consisting of the salts and hydroxides of copper, cobalt and nickel capable of forming a metal complex with said azoic dye.

2. The process of claim 1 in which the said composition comprises a soap and a metallizing copper compound in an aqueous medium.

3. The process of claim 2 in which the copper compound is copper chloride.

4. The process of claim 2 in which the copper compound is copper acetate.

5. The process of claim 2 in which the copper compound is copper sulphate.

6. The process of claim 1 in which the said composition comprises a soap and a metallizing cobalt compound is an aqueous medium.

7. The process of claim 6 in which the cobalt compound is cobalt chloride.

8. The process of claim 1 in which the said composition comprises a soap and a metallizing nickel compound in an aqueous medium.

9. The process of claim 8 in which the nickel compound is nickel sulphate.

10. A process comprising aftertreating fibrous material dyed with an azoic dye devoid of solubilizing groups and containing in o,o'-positions relative to an azo linkage groups capable of conversion to a complex metal compound with an alkaline composition comprising a soap, at least one metallizing compound of the group consisting of the salts and hydroxides of copper, cobalt and nickel capable of forming a metal complex with said azoic dye, and a coordinating agent selected from the group consisting of aliphatic amino- and hydroxy-carboxylic acids.

11. The process of claim 10 in which the metallizing compound is a copper compound and the coordinating agent is an aliphatic amino-carboxylic acid.

12. The process of claim 10 in which the metallizing compound is a copper compound and the coordinating agent is an aliphatic hydroxy-carboxylic acid.

13. The process of claim 10 in which the metallizing compound is copper chloride and the coordinating agent is glycine.

14. The process of claim 10 in which the metallizing compound is copper chloride and the coordinating agent is tartaric acid.

15. The process of claim 10 in which the metallizing compound is copper chloride and the coordinating agent is glycollic acid.

16. The process of claim 10 in which the metallizing compound is copper acetate and the coordinating agent is tartaric acid.

17. The process of claim 1 in which the azoic dye contains 2 hydroxy groups in ortho, ortho' position relative to the azo linkage therein.

18. The process of claim 10 in which the azoic dye contains 2 hydroxy groups in ortho, ortho' position relative to the azo linkage therein.

19. An alkaline composition for aftertreating fibrous material dyed with an azoic dye devoid of solubilizing groups and containing in o,o'-positions relative to an azo linkage groups capable of conversion to a complex metal compound, comprising soap, at least one metallizing compound of the group consisting of the salts and hydroxides of copper, cobalt and nickel capable of forming a metal complex with said azoic dye, and a coordinating agent selected from the group consisting of aliphatic amino- and hydroxy-carboxylic acids.

References Cited in the file of this patent

UNITED STATES PATENTS

| | | |
|---|---|---|
| 1,481,012 | Kalusowski | Jan. 15, 1924 |
| 2,148,659 | Straub | Feb. 28, 1939 |
| 2,185,905 | Straub | Jan. 2, 1940 |

FOREIGN PATENTS

| | | |
|---|---|---|
| 842,215 | France | Feb. 27, 1939 |
| 531,470 | Great Britain | Jan. 6, 1941 |